United States Patent [19]

Musgrove

[11] 4,020,961

[45] May 3, 1977

[54] OBJECT LOADING AND UNLOADING APPARATUS

[76] Inventor: Archie E. Musgrove, 710 E. 20th St., Newton, Iowa 50208

[22] Filed: Oct. 22, 1975

[21] Appl. No.: 624,962

[52] U.S. Cl. ............................. 214/450; 74/520; 214/82

[51] Int. Cl.² ................................. B60P 3/10

[58] Field of Search ............ 214/1 A, 82, 143, 450, 214/453, 454, 512; 74/520, 521

[56] References Cited

UNITED STATES PATENTS

| 3,664,454 | 5/1972 | Cottrell | 74/520 X |
| 3,746,194 | 7/1973 | Koenig | 214/450 |
| 3,877,594 | 4/1975 | Coakley | 214/450 |
| 3,894,643 | 7/1975 | Wilson | 214/450 |

FOREIGN PATENTS OR APPLICATIONS

| 649,253 | 9/1962 | Canada | 214/1 A |
| 771,251 | 3/1957 | United Kingdom | 74/521 |

Primary Examiner—L. J. Paperner
Attorney, Agent, or Firm—Henderson, Strom & Sturm

[57] ABSTRACT

Apparatus for loading and unloading objects such as boats to and from elevated surfaces such as the tops of vehicles. Spring biased structures provide for allowing the object to lie substantially horizontally on top of a vehicle and for causing one end of the object to be elevated for unloading purposes when desired. The spring biased structure also prevents the object from pivoting too quickly during the loading process and thereby causing an undesirable impact between the vehicle top and the object during this loading process. A winch is provided for pulling the object onto the vehicle top or for allowing a controlled unloading by utilizing a gravity force limited by the winch. Rollers are clamped on one end of the object and a rod pivotally attached to the vehicle causes the roller end of the object to be spaced sufficiently from the vehicle when the rollers are near the ground to thereby aid in the controlled handling of the object.

9 Claims, 11 Drawing Figures

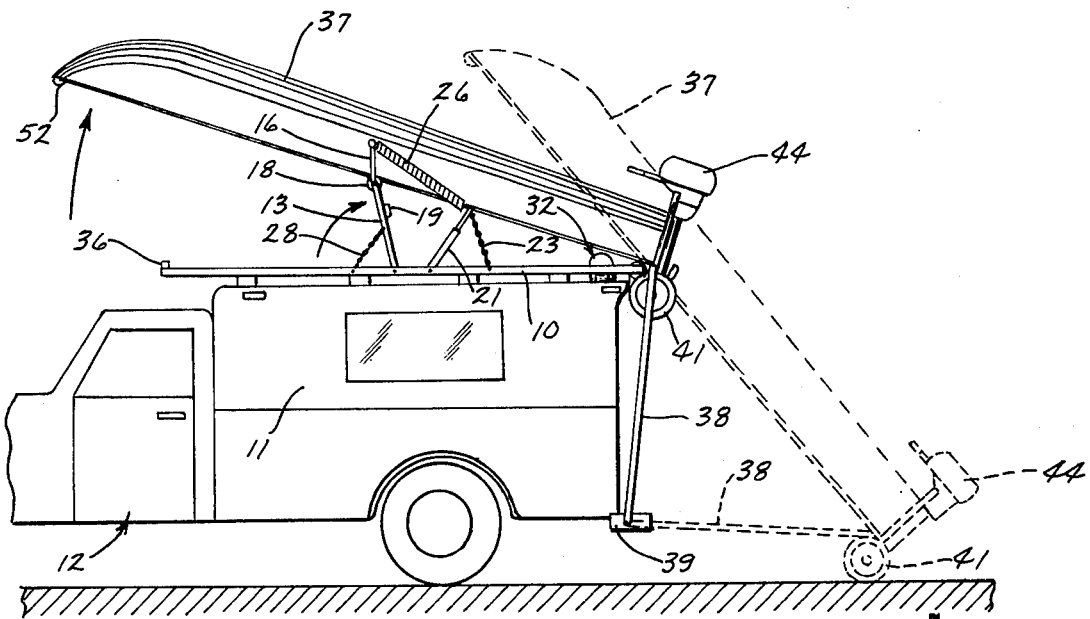
Fig. 6
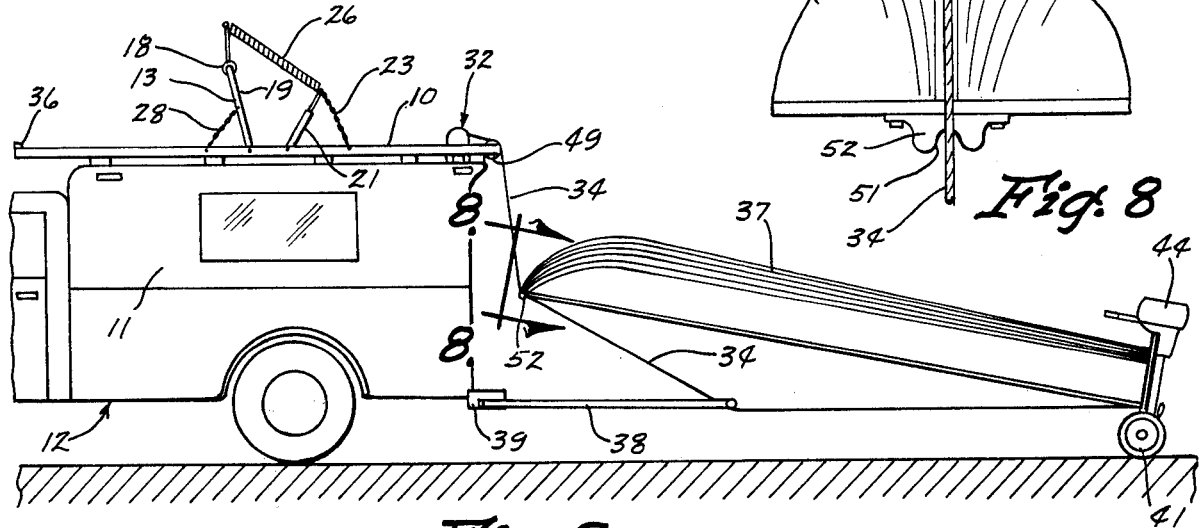
Fig. 7
Fig. 8
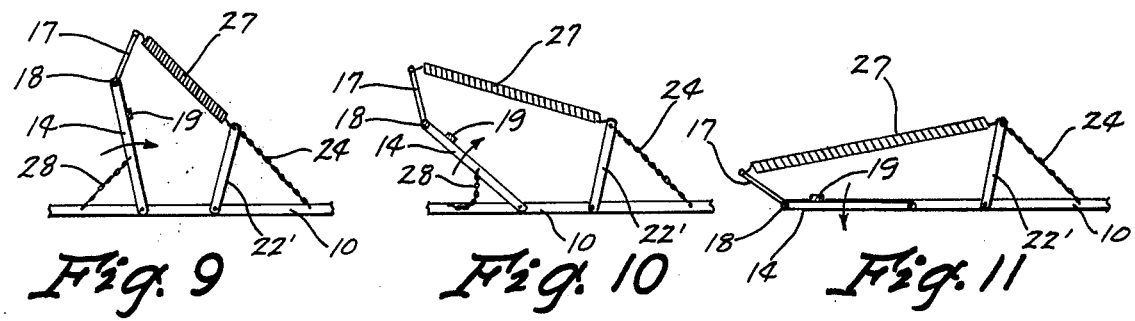
Fig. 9   Fig. 10   Fig. 11

OBJECT LOADING AND UNLOADING APPARATUS

BACKGROUND OF THE INVENTION

The present invention relates generally to an apparatus for loading and unloading objects to and from elevated surfaces, and particularly to such devices for loading and unloading boats to or from the top of a vehicle.

It has long been a practice to carry objects on top of a vehicle rather than to transport such objects by the use of a trailer, which could entail a significantly extra expense and create traveling problems associated with the towing of a trailer. To a large extent, however, such transporting of objects on top of a vehicle have been limited to objects which were of a small enough size and weight so that they could be manually handled easily in the loading and unloading process. It would, of course, be desirable to have equipment available to aid in allowing larger objects to be loaded and unloaded from a vehicle top or even to have such apparatus available for improving the ease with which objects of any size could be loaded or unloaded from a vehicle top.

One of the objects which is most often carried on top of a vehicle is a boat. Boat loading and unloading devices has been constructed for facilitating easy loading and unloading of boats, for example, as shown in U.S. Pat. Nos. 3,696,953, 3,777,922, 3,878,954 and 3,885,689. Such devices have been developed primarily for use on campers, some of which are attached to pickup trucks and the like because such vehicles are normally much higher than the top of an automobile would be, and because the camping equipment and the boating equipment would be used on the same types of outings.

Quite often it is desired to load or unload a boat when only one person is present. This can be a difficult problem manually, especially if the boat is large or the surface to which the boat is to be loaded is high, or both, such as in the camper situation described above. It is because of these problems that boat loading and unloading devices have been devised. Some boat loading and unloading devices are terribly complicated to use and very expensive to produce. Also, many boat loading devices do not provide for easy unloading without substantial manual assistance.

It is therefore a definite need for a simple and economical loading and unloading device which can be operated by a single individual.

SUMMARY OF THE INVENTION

The present invention relates to a device for loading and unloading an object to or from an elevated surface such as a vehicle top, and includes a structure for selectively moving one end of the object to one of two positions when on top of such vehicle. In one of the positions, the object is oriented substantially horizontally for transporting the object from place to place on the top of the vehicle. In the other position, one end of the object is elevated for the purpose of allowing gravity to aid in the unloading of the object. An object supporting member holds the object in this elevated position for unloading and it also supports the object during the loading process so that one end of the object does not drop down with a substantial force when being moved to the top of the vehicle. A winch attached to a frame of the apparatus allows for a controlled loading and unloading for the purpose of minimizing the manual labor necessary in the operation of the device.

An object of the present invention is to provide a device for loading and unloading objects to and from an elevated surface respectfully.

Another object of the invention is to utilize gravity for unloading an object from an elevated surface.

A further object of the invention is to utilize springs for the purpose of elevating one end of an object so that gravity can be used for unloading.

Still another object of the invention is to provide an object loading and unloading device which is simple to operate and economical to manufacture.

Other objects, advantages, and novel features of the present invention will become apparent from the following description of the invention when considered in conjunction with the accompanying drawings.

DESCRIPTION OF THE DRAWINGS

FIG. 6 is a side elevational view of the present invention showing the initial steps for unloading a boat using the present invention;

FIG. 7 is a side elevational view of the present invention showing the final stages of unloading or the initial stages of loading a boat utilizing the present invention;

FIG. 8 is a partial cross sectional view taken along lines 8—8 of FIG. 7; and FIGS. 9—11 are schematic views of the structure shown in FIG. 5 and illustrating the direction of the forces on the pivoted levers in the various positions thereof which are exerted by the springs.

DESCRIPTION OF THE PREFERRED EMBODIMENT

Figure 1:
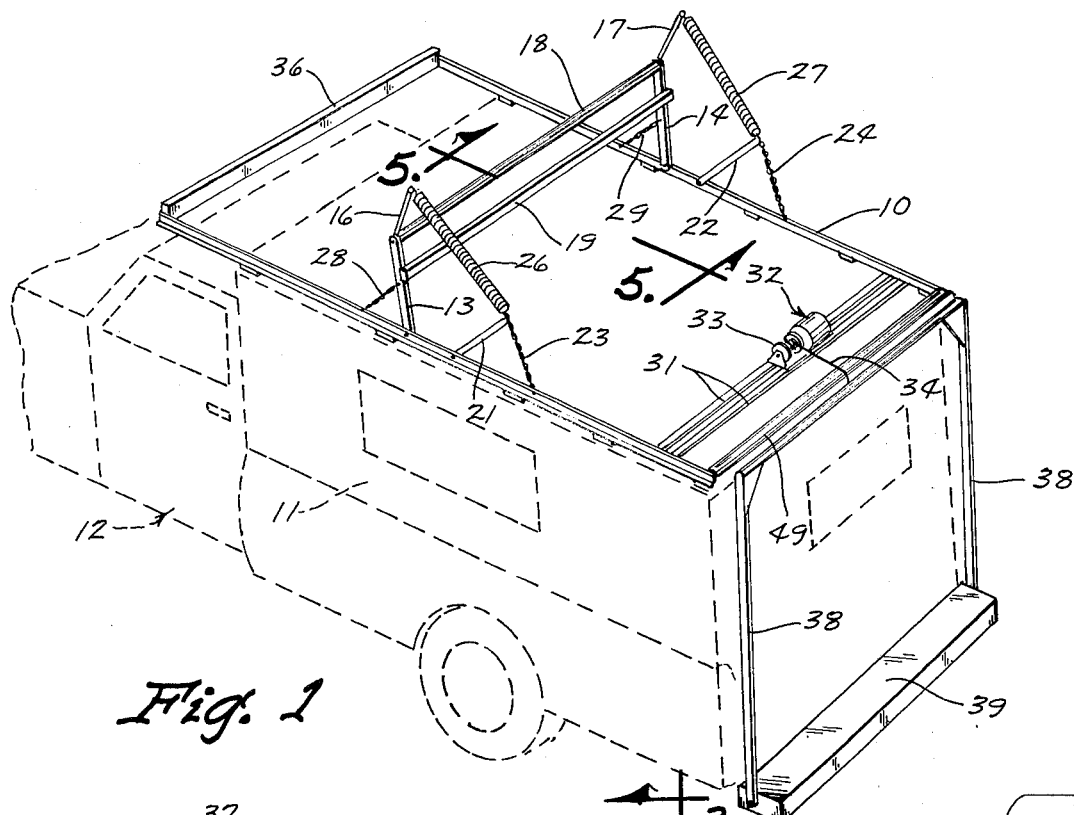
FIG. 1 is a perspective view of the apparatus of the present invention.

Referring now to the drawings wherein like reference numerals designate identical or corresponding parts throughout the several views, FIG. 1 shows a frame 10 secured to the top of a camper 11 which is, in turn, attached to a pickup truck 12. Pivotally attached to the frame 10 is a first member 13 and a second member 14. These first and second members 13 and 14 have extension members 16 and 17 at the top ends thereof, which are rigidly affixed to the first and second members 13 and 14. These extension members 16 and 17 can be considered to be the same member as the first and second members 13 and 14 and are utilized merely for the convenience of the construction.

A third member 18 is attached to the first and second members 13 and 14. This third member 18 preferably takes the form of an elongated roller which is rotatably mounted to the first and second members 13 and 14 for the purpose of allowing a boat or other object to travel along the top thereof without generating a substantial amount of friction. A support rod 19 also connects the first and second members 13 and 14 to add some extra stability to the device.

A fourth member 21 and a fifth member 22 are also pivotally attached to the frame 10 at the bottom ends thereof, but these fourth and fifth members 20 and 22 are substantially prevented from pivoting because of the attachment of chains 23 and 24 to the top ends thereof respectively and also by the attachment of springs 26 and 27 thereto as will be explained below. These chains 24 are also connected to the frame 10. Chains 23 and 24 are provided to allow relative adjustment of the height of the members 21 and 22 for reasons which will be apparent in view of the discussion below.

Figure 5:
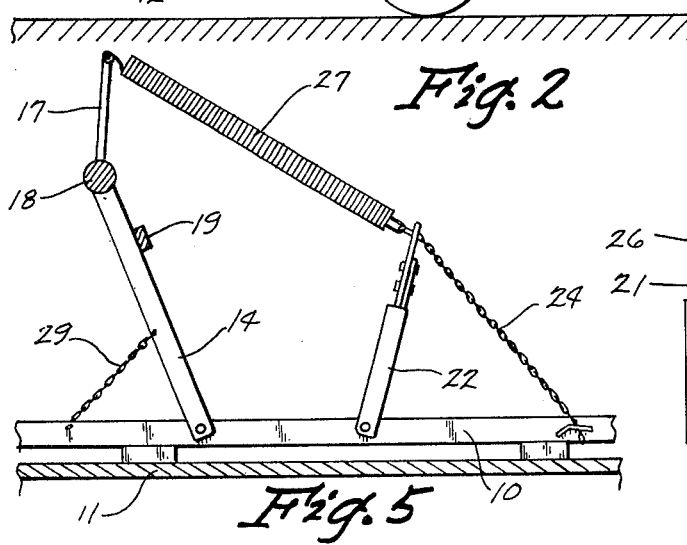
FIG. 5 is an enlarged partial cross sectional view taken along lines 5—5 of FIG. 1.

A pair of coil, compression springs 26 and 27 are attached at one end thereof respectively to the fourth and fifth members 21 and 22 and at the other ends thereof respectively to the extension portion 16 and 17 of the first and second members 13 and 14. The springs 26 and 27 exert a force tending to pull the first and second members 13 and 14, and thereby also the third member 18 towards the fourth and fifth members 21 and 22. It is desired, however, that the first, second, and third members 13, 14, and 18 respectively be allowed to move only to approximately the point shown in FIGS. 1 and 5, for example, and this movement is limited by the chains 28 and 29. The chains 28 and 29 can also be varied in length to adjust the upper-most position to which the first and second members 13 and 14 can go.

A pair of angle bars 31 are attached across the rear end of the frame 10 and serve as a mounting for an electric winch 32. This electric winch has a reel 33 with a cable 34 attached thereto. The winch 32 is operable by means of a switch (not shown) to selectively reel up the cable 34 onto the reel 33 or to unwind the cable 34 from the reel 33 as is well known. A support brace 36 extending across the frame 10 serves as a front support for the boat 37 or for any other object which is to be loaded on the frame 10 for transportation from place to place.

A U-shaped rod 38 is pivotally attached to the rear bumper 39 of the truck 12. This rod 38 could merely just be a straight rod which is pivoted centrally on the bumper, but it is preferably U-shaped, as shown, so that it does not impede access to the camper 11 from the rear thereof.

Figure 4:
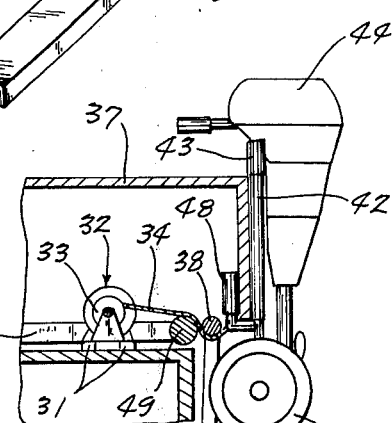
FIG. 4 is a partial cross sectional view taken along lines 4—4 of FIG. 3.
Figure 3:
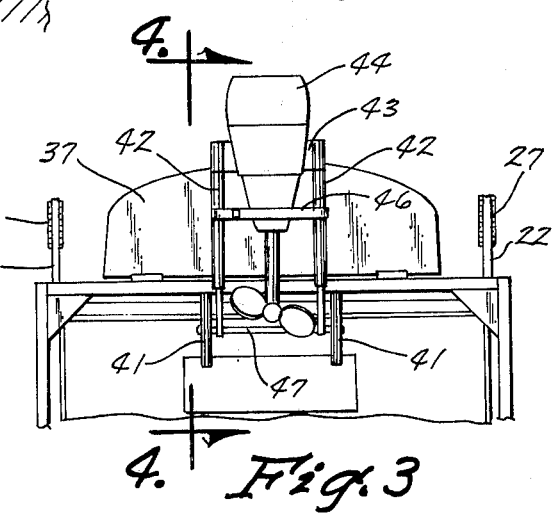
FIG. 3 is a partial rear view taken along lines 3—3 of FIG. 2.

In order to load an object such as a boat 37 onto the frame 10, a roller structure 41 is clamped to the boat 37 as can clearly be seen in FIGS. 3 and 4, for example. A frame is provided on the roller structure 41, including members 42 and 43, for clamping a motor 44 thereon. Furthermore, a strap 46 is preferably utilized to insure that the motor 44 would not be lost if it became unclamped from the member 43. An axle 47 connected at the bottom ends of both of the frame members 42 serves to rotatably mount the wheels 41. It is not at all critical how the roller device 41 is attached to the boat 37, and this may be done merely by means of clamps 48 or any other structure desired.

Referring to FIG. 4, it can be seen that the cable 34 is releasably attached to the rear end of the boat 37 by the use of a hook or clip (not shown). The cable 34 extends from the rear of the boat 37, under the top of the U-shaped rod 38 and then over a rear member 49 of the frame 10, which rear member 49 preferably takes the form of an elongated roller rotatably mounted to the rear end of the frame 10.

Figure 2:
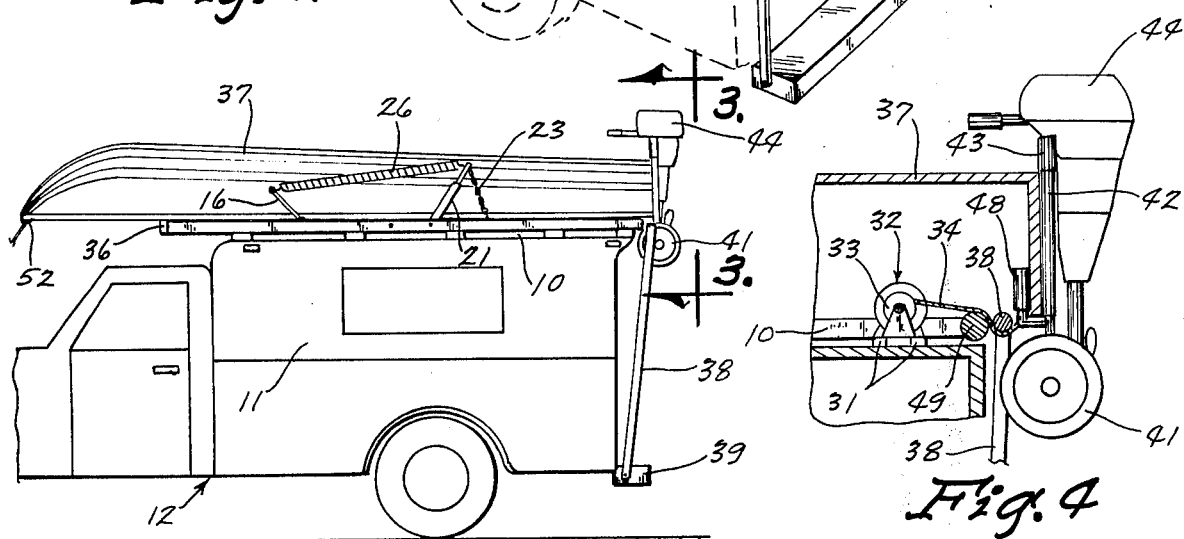
FIG. 2 is a side view of the present invention with a boat loaded thereon for transporting from place to place.

Referring to FIG. 7, it can be seen that once the cable 34 is so attached to the boat 37 such that it goes over the roller 49, down across the front of the boat so as to be guided in the slot 51 of the guiding structure 52 and then down under the U-shaped rod 38 and attached to the rear end of the boat 37, then the structure including first and second members 13 and 14 attached to the frame 10 is elevated to the position shown in FIG. 7 if not already in this position. Then the winch 32 is activated so as to reel up the cable 34. During this operation, the boat will move sequentially from the position shown in FIG. 7 to the position shown in dashed lines in FIG. 6, and then to the position shown in solid lines in FIG. 6. After the boat is in the position shown in solid lines in FIG. 6, then it is manually pulled downwardly from the front end thereof so as to overcome the bias of the springs 26 and 27, until it is moved to the position shown in FIG. 2. At such time, the first and second members 13 and 14 will have been moved past and over-center, such that the springs 26 and 27 will tend to hold the first and second levers 13 and 14 in the position shown in FIGS. 2 and 11 as shown schematically in FIG. 11. The front of the boat 37 would, however, need to be tied down for transportation from place to place to prevent the wind from lifting up the boat. It is noted that no further tieing down is really needed, since the rear end is held down by the cable 34 and the rod 38.

When it is desired to unload the boat 37, the front end is untied from the truck 12 and given a slight manual urging upwardly. This upward urging of the boat is normally enough to release the springs 26 and 27 to exert an upward force on the first and second members 13 and 14 as shown in FIGS. 9 and 10 schematically for moving the first and second members 13 and 14 to the position shown in FIGS. 1, 5, 6, 7 and 9. It is possible that a slight urging might be needed to be made directly to the first and second members 13 and 14, however, the device is constructed so that the counterclockwise force depicted in FIG. 11 is very slight and ideally is almost nonexistent and such that the spring force is essentially counteracted by being more or less at the center, but not quite over and past center. When this has been done, the boat 37 will be in the position shown in solid lines in FIG. 6. The winch 32 is then utilized to slowly unwind the cable 34, which will allow the boat to move, by force of gravity, first to the general position as shown in dashed lines in FIG. 6 wherein the wheels 41 are on the ground, and then finally to the position shown in FIG. 7 whereby the boat 37 is essentially unloaded. The cable 34 would be unwound slightly more than that shown in FIG. 7 so that the front end of the boat is almost on the ground, at which time the cable 34 would be disconnected from the rear end of the boat 37 and the boat can be wheeled by the rollers 41 whatever short distance is required to get it near the water. At such time, then the clamp 48 is unfastened and the roller structure 41, along with the motor 44 is removed from the rear end of the boat. The boat can then be put into the water and the motor placed on the boat in a conventional fashion.

Accordingly, it can be seen that the present invention does indeed accomplish all of the objects mentioned above. Obviously, many modifications and variations of the present invention are possible in light of the above teachings. It is therefore to be understood that, within the scope of the appended claims, the invention may be practiced otherwise than as specifically subscribed.

I claim:

1. Apparatus for loading or unloading an object to or from an elevated surface comprising:

a frame adapted to be attached to an elevated surface;

a first member pivotally attached to said frame along a first pivotal axis;

a second member pivotally attached to said frame along said first pivotal axis;

a third member connected to said first and second members for supporting a portion of said object;

a fourth member attached to said frame at one end thereof;

biasing means attached to the other end of said fourth member at one end thereof and to one of said first, second and third members at the other end thereof, for biasing said first member towards said fourth member and thereby biasing said third member upwardly;

means connected to said frame for preventing said first member from pivoting past a predetermined point towards said fourth member; and winch means connected to said frame for connection to said object for selectively pulling the object upwardly onto said third member in one operative direction of the winch means or for slowly allowing gravity to lower the object in a second operative direction of said winch means.

2. Apparatus as defined in claim 1 wherein said fourth member is pivotally mounted to the frame along a second axis; and means being connected to said frame for preventing said fourth member from pivoting beyond a predetermined point towards said first member.

3. Apparatus as defined in claim 2 including a fifth member pivotally connected to said frame along said second axis;

a second biasing means being attached to said fifth member and to said second member for biasing said second member towards said fifth member.

4. Apparatus as defined in claim 3 including means connected to said frame for preventing said fifth member from pivoting beyond a predetermined point towards said second member.

5. Apparatus as defined in claim 1 wherein said first member has a first elevated operative position and a second lowered position, said biasing means applying a force in one rotary direction to said first member in said first elevated position and applying a force to said first member in an opposite rotary direction about said first axis in said second lowered position.

6. Apparatus as defined in claim 1 including roller means for attachment to one end of said object for rolling said one end of object along the ground during the loading and unloading process.

7. Apparatus as defined in claim 6 wherein said object is a boat and said roller means has a boat motor attached thereto.

8. Apparatus as defined in claim 1 wherein said frame is attached to the top of a vehicle.

9. Apparatus as defined in claim 8 wherein a rod is pivotally attached at one end thereof to a lower portion of one end of said vehicle; guide means attached to the other end of said rod for causing one end of the object to be spaced from said vehicle when said end is near the ground and having a cable being attached to said object and the other end thereof being attached to said winch means.

* * * * *